United States Patent [19]
Tanaka

[11] Patent Number: 5,360,685
[45] Date of Patent: * Nov. 1, 1994

[54] NONAQUEOUS BATTERY

[75] Inventor: Mitsutoshi Tanaka, Kanagawa, Japan

[73] Assignee: Fuji Photo Film Co., Ltd., Kanagawa, Japan

[*] Notice: The portion of the term of this patent subsequent to Oct. 6, 2010 has been disclaimed.

[21] Appl. No.: 132,669

[22] Filed: Oct. 6, 1993

[30] Foreign Application Priority Data

Oct. 8, 1992 [JP] Japan .................................. 4-270289

[51] Int. Cl.$^5$ ............................................. H01M 2/08
[52] U.S. Cl. .................................. 429/185; 429/174; 429/194
[58] Field of Search ................ 429/185, 174, 194, 171

[56] References Cited

U.S. PATENT DOCUMENTS

| 4,248,944 | 2/1981 | Smilanich | 429/185 |
| 4,256,815 | 3/1981 | Smilanich et al. | 429/185 |
| 5,306,582 | 4/1994 | Tanaka | 429/185 |

FOREIGN PATENT DOCUMENTS 63-1706  1/1988  Japan .

Primary Examiner—John S. Maples
Attorney, Agent, or Firm—Sughrue, Mion, Zinn, Macpeak & Seas

[57] ABSTRACT

A battery comprising a positive electrode, a negative electrode, and a non-aqueous electrolyte is provided, characterized in that said battery is sealed off with a sealant comprising a pitch, at least one polymer and at least one montmorillonite.

19 Claims, 2 Drawing Sheets

NONAQUEOUS BATTERY

FIELD OF THE INVENTION

The present invention relates to a battery, and more particularly to a nonaqueous battery comprising an active material of light metal or its alloy or an active material capable of intercalating/deintercalating lithium ion as a negative electrode.

BACKGROUND OF THE INVENTION

A nonaqueous battery comprises an active material that can easily react with water (e.g., a light metal or its alloy or material capable of intercalating/deintercalating lithium ion) as a negative electrode. Therefore, the nonaqueous battery is arranged such that no water is incorporated in the electrolyte, and the battery container is hermetically sealed to prevent water from entering the battery. The battery container consists of a can or metal member and an insulating sealing material (also referred to as "gasket").

In order to provide perfect sealing, a sealant is provided between the can or metal member and the insulating sealing material. As such sealants, various compounds have been proposed which allegedly can prevent the entry of water and exhibit resistance to an organic solvent contained in the battery as an electricity-generating element. Among these compounds, a pitch (bituminous substance) such as asphalt and coal tar are most widely used. JP-A-56-32671, JP-A-57-194453, JP-A-58-10365, and JP-A-59-859 (The term "JP-A" as used herein means an "unexamined published Japanese patent application") disclose the use of a pitch as the sole sealant. These applications describe that the selection of a sealant having proper physical properties or the coating of such a sealant on the surface of both the metal member and the insulating sealing material renders the battery more resistant to liquid leakage at a temperature as high as 60° C. at a relative humidity of 90%. However, their effects leave much to be desired.

Thus, mixtures of pitch with the following compounds have been proposed. One of these proposals is a mixture of pitch with a mineral oil as disclosed in JP-B-61-36344 (The term "JP-B" as used herein means an "examined Japanese patent publication"). This proposal allegedly provides a further improvement in the resistance of the battery to liquid leakage during storage at a temperature as high as e.g., 60° C. for 100 days or in a 60° C.-minus 10° C. heat cycle. Another proposal is disclosed in JP-A-U-57-194254 (The term "JP-A-U" as used herein means an "unexamined published Japanese utility model application"), JP-A-58-112246, JP-A-59-78443, and JP-A-63-80471 which comprises mixing a pitch with a silicone rubber. This approach allegedly improves the resistance of the battery to liquid leakage during storage at a temperature as high as e.g., 60° C. for 100 days or in a 60° C.-minus 10° C. heat cycle. Further, an approach which comprises mixing a pitch with a thermoplastic or thermosetting resin is proposed in JP-A-59-91660 and JP-A-63-202845. This approach allegedly provides an improvement in the resistance of the battery to liquid leakage during storage at a temperature as high as e.g., 60° C. or 70° C. for 100 days or in a 60° C.-minus 10° C. heat cycle by mixing a pitch with vinyl acetate or atactic polypropylene as a resin. In an approach proposed in JP-B-63-1706, the use of a cationic aqueous dispersion obtained by dispersion-suspending either a pitch (asphalt) or a rubber latex (e.g., styrene-butadiene rubber, butadiene rubber, chloroprene rubber, ethylenepropylene rubber) or a mixture thereof in water with a cationic surface active agent as a sealant allegedly improves in the resistance of the battery to liquid leakage during the storage at a temperature as high as 45° C. at a relative humidity of 90% for 1 to 12 months.

These prior approaches provide an improvement in the resistance of the battery to liquid leakage during the storage at an elevated temperature. However, even these approaches leave much to be desired in the following respects.

The sealing of a nonaqueous battery can be accomplished by pressing a negative electrode can or positive electrode can against an insulating sealing material made of a synthetic resin via a sealant as shown by the reference numerals 12, 13, 14 and 15 in FIG. 2. The strength by which the negative or positive can is pressed against the sealing material is called sealing strength. The sealing strength is affected by the shape of the sealing mold and the molding size of the insulating synthetic resin sealing material or metal member. In particular, the sealing mold is gradually worn away as the sealing process is conducted repeatedly. As a result, the sealing strength is gradually reduced.

On the other hand, a nonaqueous battery is characterized by electricity-generating elements having a high resistance to low temperatures and thus can be used at a temperature as low as $-10°$ C., $-30°$ C., and even $-60°$ C. Once sealing strength is deteriorated, the foregoing nonaqueous batteries have a short resistance to liquid leakage when used at low temperatures.

SUMMARY OF THE INVENTION

It is therefore an object of the present invention to provide a nonaqueous battery which still exhibits a high resistance to low temperatures even with fluctuations of sealing strength.

The foregoing and other objects and advantages of the present invention will become more apparent from the following detailed description and examples.

The object of the present invention is accomplished with a battery comprising a positive electrode, a negative electrode, and an electrolyte, wherein the battery is sealed off with a sealant comprising a pitch, at least one polymer and at least one montmorillonite.

The object of the present invention is also accomplished with a battery as defined above, wherein the negative electrode is a light metal or its alloy or an active material capable of intercalating/deintercalating lithium ion and the electrolyte is a nonaqueous electrolyte.

BRIEF DESCRIPTION OF THE DRAWINGS

By way of example and to make the description more clear, reference is made to the accompanying drawings in which.

DETAILED DESCRIPTION OF THE INVENTION

Figure 1:
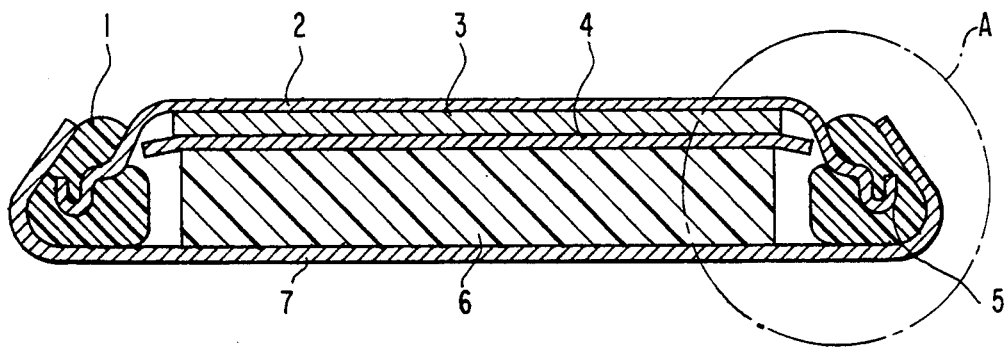
FIG. 1 illustrates an embodiment of a coin-shaped battery according to the present invention.

The montmorillonite to be used in the present invention is also referred to as "smectite" and is a typical group of minerals constituting clay. The montmorillonite belongs to the phyllosilicate class of minerals, all of which assume a three-layer structure. This three-layer structure is known to consist of a tetrahedral sheet (a tetrahedron comprising SiIV or AlIII surrounded by four oxygen atoms, three of the four apexes of which are shared with three of the four apexes of an adjacent tetrahedron and the other extending in the same plane as the corresponding apex of the adjacent tetrahedron to form a hexagonal net), an octahedral sheet (an octahedron comprising a middle-sized cation such as AlIII, MgII and FeII, optionally FeIII, CrIII, MnII and Li, surrounded by six hydroxyl groups or oxygen atoms, the edges of which are shared with that of adjacent octahedron to make a two-dimensional extension), and a tetrahedral sheet as defined above in this order, with cations, organic materials or the like are intercalated between one three-layer structure and another (hereinafter referred to as "between layers"). The chemical composition of the montmorillonite can be represented by the following general formula:

$$X_m(YII, YIII)_{2-3}Z_4O_{10}(OH)_2 \cdot nH_2O$$

wherein X represents a metal (e.g., alkali metal such as K and Na, alkaline earth metal such as ½ Ca and ½ Mg) or organic material (e.g., amine, amine derivative); YII represents Mg, FeII, MnII, Ni, Zn or Li; YIII represents Al, FeIII, MnIII or CrIII; and Z represents Si or Al, with the proviso that X represents a cation present between layers, Y represents a cation present in the octahedron, Z represents a cation present in the tetrahedron, the symbols I, II, III and IV each represents the ionic valency of the respective elements, m represents 0.25 to 0.6, the suffix figures each represents a subscript indicating the composition, nH$_2$O represents water present between layers, and n represents an integer.

The montmorillonite used in the present invention can be classified as follows. These montmorillonites may be used singly or in combination.

(1) Bi-octahedron type (Cations existing in the octahedron are mainly trivalent)
Montmorillonite
$X_{0.33}(Al_{1.67}Mg_{0.33})Si_4O_{10}(OH)_2 \cdot nH_2O$
Magnesia montmorillonite
$X_{0.33}(Al_{1.34}Mg_{0.83})Si_4O_{10}(OH)_2 \cdot nH_2O$
Ferric montmorillonite
$X_{0.33}((FeIII)_{1.67}Mg_{0.33})Si_4O_{10}(OH)_2 \cdot nH_2O$
Ferric magnesia montmorillonite
$X_{0.33}((FeIII)_{1.34}Mg_{0.33})Si_4O_{10}(OH)_2 \cdot nH_2O$
Bidellite
$X_{0.33}(Al_2)(Al_{0.33}Si_{3.67})O_{10}(OH)_2 \cdot nH_2O$
Aluminian bidellite
$X_{0.33}(Al_{2.17})(Al_{0.83}Si_{3.17})O_{10}(OH)_2 \cdot nH_2O$
Nontronite
$X_{0.33}((FeIII)_2)(Al_{0.33}Si_{3.67})O_{10}(OH)_2 \cdot nH_2O$
Aluminian nontronite
$X_{0.33}((FeIII)_{2.17})(Al_{0.83}Si_{3.17})O_{10}(OH)_2 \cdot nH_2O$ (2) Tri-octahedron type (Cations existing in the octahedron are mainly bivalent)
Saponite
$X_{0.33}(Mg_3)(Al_{0.33}Si_{3.67})O_{10}(OH)_2 \cdot nH_2O$
Aluminian saponite
$X_{0.33}(Mg_{2.67}Al_{0.33})(Al_{0.67}Si_{3.33})O_{10}(OH)_2 \cdot nH_2O$
Ferric saponite
$X_{0.33}(Mg, Fe)_3(Al_{0.33}Si_{3.67})O_{10}(OH)_2 \cdot nH_2O$
Hectorite
$X_{0.33}(Mg_{2.67}Li_{0.33})Si_4O_{10}(OH)_2 \cdot nH_2O$
Sorkonite
$X_{0.33}(Mg, Zn)_3(Si_{3.67}Al_{0.33})O_{10}(OH)_2 \cdot nH_2O$
Stibinsite
$X_{0.33/2}(Mg_{2.97})Si_4O_{10}(OH)_2 \cdot nH_2O$ Preferred among these montmorillonites are tri-octahedron type montmorillonites, particularly hectorite.

The montmorillonite to be used in the present invention may comprise a metal (e.g., alkali metal such as K and Na, alkaline earth metal such as Ca and Mg) or organic material (e.g., amine, amine derivative) as the X ion of the above formula present between layers. Preferred examples of such a metal include K, Na, Ca, Mg, and Li. Preferred examples of the organic material include amines or amine derivatives.

The amines or amine derivatives include those represented by the following formula:

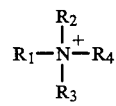

In the above formula, R$_1$, R$_2$, R$_3$, and R$_4$ each represents —H, alkyl group, allyl group, aryl group (e.g., benzyl) or the like (some of these groups may contain —OH, —O—, C=C, etc.). R$_2$, R$_3$, R$_4$ and N may together form an aromatic ring such as pyridinium. Preferred among compounds represented by the above formula is one wherein at least one of R$_1$, R$_2$, R$_3$, and R$_4$ contains a C$_{10-24}$ alkyl group or a benzyl group or a C$_{6-24}$ aryl group.

The organic material may be a phosphonium, oxonium, sulfonium, arsonium, stibonium or the like.

The sealant to be used in the present invention may comprise a pitch and a montmorillonite in admixture in any proportion (by weight). In the present invention, the pitch/montmorillonite mixing proportion by weight is preferably from 99.8/0.2 to 60/40, more preferably 99/1 to 80/20, most preferably 98/2 to 85/15.

The polymer as defined herein preferably includes a high molecular weight compound having a molecular weight of more than several hundreds (for example, 800 to 10,000,000). Examples of the polymer according to the present invention include rubber (used herein as a general term for high molecular weight compounds having a rubber-like elasticity around room temperature, also referred to as "elastomer", the glass transition temperature of which generally ranges from −200° C. to 0° C.) and plastomer (used herein as a general term for thermoplastic or thermosetting high molecular weight compounds, the glass transition temperature of which generally ranges from 50° C. to 200° C.). In the present invention, various kinds of polymers may be used as exemplified below. These polymers may be used singly or in combination as necessary.

Examples of the plastomer suitable for use in the present invention include polyvinyl acetate, atactic polypropylene, polystyrene, polybutene, polyamide, and polythiol. Preferred among these plastomers are polybutene, polyamide, polythiol, and atactic polypropylene. Particularly preferred among these plastomers is polybutene (an isobutylene copolymer containing a small amount of n-butene; these copolymers are known in the art under the name, "Polybutene"; the known compound is also referred to under the number, "6-774"). Most preferred among these polybutenes is one having a weight average molecular weight of 500 to 5,000.

The sealant to be used in the present invention may comprise a pitch and a polybutene in any mixing proportion by weight. In the present invention, the pitch/polybutene mixing proportion by weight is preferably 95/5 to 40/60, particularly 85/15 to 60/40.

In the present invention, various kinds of rubbers may be used. Preferred among these rubbers are non-silicone rubbers. Further preferred among these rubbers is a rubber having double bonds in its main chain or side chains or a rubber having a main chain which is a copolymer of at least two polymerizable monomers.

Preferred examples of rubbers suitable for use in the present invention include natural rubber (NR), isoprene rubber (IR), butadiene rubber (BR), 1,2-polybutadiene rubber (1,2-BR), styrene-butadiene rubber (SBR), chloroprene rubber (CR), nitrile rubber (NBR), butyl rubber (IIR), ethylene-propylene rubber (EPM), ethylene-propylene-diene monomer rubber (EPDM), chlorosulfonated polyethylene rubber (CSM), and acrylic rubber (ACM, ANM) (the abbreviations in the parenthesis represent the ASTM abbreviation). Preferred among these rubbers are isoprene rubber (IR), styrene-butadiene rubber (SBR), chloroprene rubber (CR), nitrile rubber (NBR), ethylene-propylene rubber (EPM), ethylene-propylene-diene monomer rubber (EPDM), and chlorosulfonated polyethylene rubber (CSM). Most preferred among these rubbers is EPDM rubber having a main chain which is a terpolymer of ethylene unit, propylene unit and diene unit.

EPDM suitable for use in the present invention preferably exhibits a Mooney viscosity (as determined at 100° C., the higher this value is, the higher the molecular weight is) of 20 to 200, more preferably 30 to 150, most preferably 40 to 80. EPDM suitable for use in the present invention may comprise various diene units. Preferred among these diene units are dicyclopentadiene and ethylidene norbornene. Further preferred among these diene units is ethylidene norbornene. EPDM for use in the present invention may comprise ethylene and propylene in a wide range of mixing proportions by weight. In the present invention, the ethylene/propylene mixing proportion by weight is preferably 50/50 to 70/30.

The sealant to be used in the present invention may comprise a pitch and EPDM in any mixing proportion by weight. In the present invention, the pitch/EPDM mixing proportion by weight is preferably 99.9/0.1 to 30/70, more preferably 98/2 to 80/20.

EPM for use in the present invention preferably exhibits a Mooney viscosity of 20 to 200, more preferably 30 to 120. EPM for use in the present invention may comprise ethylene and propylene in a wide range of mixing proportions by weight. In the present invention, the ethylene/propylene mixing proportion by weight is preferably in the range of 50/50 to 70/30.

The sealant to be used in the present invention may comprise a pitch and EPM in any mixing proportion by weight. In the present invention, the pitch/EPM mixing proportion by weight is preferably 99.9/0.1 to 30/70, more preferably 98/2 to 80/20.

SBR for use in the present invention preferably exhibits a Mooney viscosity of 20 to 200, more preferably 30 to 80. SBR for use in the present invention may comprise styrene and butadiene in a wide range of mixing proportions by weight. In the present invention, the styrene/butadiene mixing proportion by weight is preferably 15/85 to 30/70.

The sealant to be used in the present invention may comprise a pitch and SBR in any mixing proportion by weight. In the present invention, the pitch/SBR mixing proportion by weight is preferably 60/40 to 30/70.

NBR for use present invention preferably exhibits a Mooney viscosity of 20 to 200, more preferably 30 to 80. NBR for use in the present invention may comprise acrylonitrile and butadiene in a wide range of mixing proportion by weight. In the present invention, the acrylonitrile/butadiene mixing proportion by weight is preferably 15/85 to 30/70, more preferably 15/85 to 25/75.

The sealant to be used in the present invention may comprise a pitch and NBR in any mixing proportion by weight. In the present invention, the pitch/NBR mixing proportion by weight is preferably 70/30 to 30/70.

IR, CR and CSM for use in the present invention may be used in the following mixing proportions. Specifically, the pitch/IR mixing proportion by weight is preferably 97/3 to 70/30, more preferably 95/5 to 80/20. The pitch/CR mixing proportion by weight is preferably 97/3 to 50/50, more preferably 95/5 to 80/20. The pitch/CSM mixing proportion by weight is preferably 99/1 to 80/20, more preferably 95/5 to 85/15.

The term "pitch (bituminous substance)" as used herein is a general term for the residue of the distillation of tar obtained by dry distillation of coal, charcoal, petroleum, etc. or analogous natural oils. A pitch is classified as coal tar (tar obtained by heat treatment of coal), wood tar (tar obtained by heat treatment of charcoal), petroleum asphalt (still residue obtained by purification of petroleum; also referred to as "petroleum pitch") or natural asphalt (occurs naturally in the bottom of lakes and in rocks). Among these tars, coal tar and wood tar contain a large amount of strongly carcinogenic substances and thus are designated as harmful substances. Thus, asphalts are preferred.

Preferred among these asphalts are petroleum asphalts in view of controllability of physical properties such as penetration, softening point and extensibility. Petroleum asphalts are considered to comprise an oily component (regarded as a mixture of saturated hydrocarbon and aromatic hydrocarbon; referred to as "medium", "petrolene", "maltene", or the like), a resinous component (regarded as containing asphalt resin, asphaltic acid, etc.), and a fine carbon component (classified as asphaltene, carben or pyrobitumen) and thus is difficult to classify by component. In accordance with JIS-K2207, petroleum asphalts are classified as straight asphalts (10 kinds) or blown asphalts (5 kinds) by production process (presence or absence of blowing) and physical properties of finished products. Most preferred among these petroleum asphalts are blown asphalts, which exhibit a high softening point, high elasticity and low temperature sensitivity. Preferred among these blown asphalts is one having a penetration (25° C.) of 0 to 40, more preferably 5 to 30, most preferably 10 to 20 as defined by JIS-K2207 and a softening point of 60° C. or higher, more preferably 80° C. or higher, most preferably 90° C. or higher as defined by JIS-K2207. The most preferred specific example of a combination of the two properties is combination of a penetration of 10 to 20 and a softening point of 90° C. to 100° C. or a combination of a penetration of 10 to 20 and a softening point of 135° C. to 155° C.

Specific examples of the combination of pitch, polymer and montmorillonite will be given below. (There are many preferred examples as mentioned above. The present invention should not be construed as being limited to those described herein.)

The combination of pitch, polymer and montmorillonite is preferably a combination of petroleum asphalt as the pitch, rubber as the polymer and montmorillonite comprising quaternary ammonium ion intercalated as X ion between layers as the montmorillonite, more preferably a combination of blown asphalt as the pitch, non-silicone rubber as the polymer and tri-octahedron type montmorillonite comprising quaternary ammonium ion intercalated as X ion between layers as the montmorillonite, most preferably a combination of blown asphalt having a penetration (25° C.) of 10 to 20 as the pitch, EPDM as the polymer and hectorite comprising quaternary ammonium intercalated as X ion between layers as the montmorillonite.

In the present invention, the sealing with a sealant comprising a pitch, at least one polymer and at least one montmorillonite can be specifically accomplished by a process which comprises separately or simultaneously dissolving or dispersing a pitch, a polymer and a montmorillonite in a nonpolar organic solvent, optionally removing sand, iron, manganese, insoluble matters, etc. from the sealant by filtration, sedimentation or the like as described in JP-A-54-162138, mixing the materials, adjusting the sealant to a proper viscosity, coating the sealant on either the portion of a metallic battery case serving also as a positive or negative electrode terminal in contact with an insulating sealing material or its vicinity or the portion of the insulating sealing material in contact with the metallic battery case or its vicinity or both, and then evaporating the organic solvent to form a sealant coating film thereon. Specific examples of the organic solvent include toluene, xylene, cyclohexane, hexane, chloroform, dichloroethane, dichloromethane, and mixture thereof.

Another specific sealing method comprises heating a pitch and a polymer to a temperature of 100° to 200° C. so that it is softened, adding a montmorillonite to the mixture, kneading the resulting mixture to make a uniform dispersion, and then coating the sealant on either the portion of a metallic battery case serving also as a positive or negative electrode terminal in contact with an insulating sealing material or its vicinity or the portion of the insulating sealing material in contact with the metallic battery case or its vicinity or both to form a sealant coating film thereon. A further specific method comprises adding a small amount of an organic solvent to a pitch and a polymer, adding a montmorillonite to the mixture, kneading the resulting mixture to make a uniform dispersion, coating the sealant on either the portion of a metallic battery case serving also as a positive or negative electrode terminal in contact with an insulating sealing material or its vicinity or the portion of the insulating sealing material in contact with the metallic battery case or its vicinity or both, and then evaporating the organic solvent to form a sealant coating film thereon. Specific examples of the organic solvent include toluene, xylene, cyclohexane, hexane, chloroform, dichloroethane, dichloromethane, and mixture thereof.

As the active material to be used in the present invention, any electrode material for a nonaqueous battery may be used. Examples of inorganic positive electrode active materials for a lithium battery include Co oxides (as described in JP-A-52-12424, DE-2,606,915), Li—Co oxides (as described in U.S. Pat. Nos. 3,945,848, 4,340,652), Li—Ni—Co oxides (as described in EP-A-243926, JP-A-63-114063, JP-A-63-211565, JP-A-63-299056, JP-A-1-120765), V oxides (as described in FR 21,611,796, JP-A-55-53077, JP-A-62-140362, JP-A-62-227358), Li-V oxides ("Denki Kagaku (Electrochemistry)", vol. 48, 432 (1980), "Journal of Electrochemical Society", vol. 130, 1225 (1983), JP-A-2-12769) Mn oxides (as described in EP-A-269855, JP-A-63-58761), Li—Mn oxides (as described in JP-A-56-136464, JP-A-56-114064, JP-A-56-114065, JP-A-56-148550, JP-A-56-221559, JP-A-1-5459, JP-A-1-109662, JP-A-1-128371, JP-A-1-209663, JP-A-2-27660), and Li—Ni—Mn oxides (as described in JP-A-63-210028).

Examples of organic high molecular positive electrode active materials include polyaniline derivatives (as described in "Molecular Crystal and Liquid Crystal", vol. 121, 173 (1985), JP-A-60-197728, JP-A-63-46223, JP-A-63-243131, JP-A-2-219823), pyrrole derivatives (as described in "Journal of Chemical Society", Chemical Communication, 854, (1979), DE 3,223,544A, JP-A-62-225517, JP-A-63-69824, JP-A-1-170615), polythiophene derivatives (as described in JP-A-58-187432, JP-A-1-12775), polyacene derivatives (as described in JP-A-58-209864), and polyparaphenylene derivatives. These derivatives include copolymers.

For these organic high molecular compounds, reference can be made to Naoya Ogata, "Dodensei Kobunshi (Electrically Conductive High Molecular Compounds", Kodansha Scientific, 1990.

Examples of the light metal or its alloy to be used as a negative electrode material in the present invention include lithium metals, and lithium alloys (e.g., Al, Al—Mn (U.S. Pat. No. 4,820,599), Al—Mg (JP-A-57-98977), Al—Sn (JP-A-63-6742), Al—In, Al—Cd (JP-A-1-144573)). These light metals and alloys can be used for a primary battery as well as a secondary battery.

Examples of the active material capable of intercalating/deintercalating lithium ion as used herein include calcined carbon compounds (as described in JP-A-58-209864, JP-A-61-214417, JP-A-62-88269, JP-A-62-216170, JP-A-63-13282, JP-A-63-24555, JP-A-63-121247, JP-A-63-121257, JP-A-63-155568, JP-A-63-276873, JP-A-63-314821, JP-A-1-204361, JP-A-1-221859, JP-A-1-274360), and lithium-containing transition metal oxides.

The electrode additive may normally comprise an electrically conductive material such as carbon, silver (as described in JP-A-63-148554) or a polyphenylene derivative (as described in JP-A-59-20971) incorporated therein.

The electrolytes generally consist of at least one aprotic organic solvent such as propionic carbonate, ethylene carbonate, γ-butyrolactone, 1,2-dimethoxyethane, tetrahydrofuran, 2-methyltetrahydrofuran, dimethylsulfoxide, 1,3-dioxolan, formamide, dimethylformamide, dioxolan, acetonitrile, nitromethane, triester phosphate (as described in JP-A-60-23973), trimethoxymethane (as described in JP-A-61-4170), dioxolan derivatives (as described in JP-A-62-15771, JP-A-62-22372, and JP-A-62-108474), sulfolane (as described in JP-A-62-31959), 3-methyl-2-oxazolidinone (as described in JP-A-62-44961), propionic carbonate derivative (as described in JP-A-62-290069, and JP-A-62-290071), tetrahydrofuran derivative (as described in JP-A-63-32872) and ethyl ether (as described in JP-A-63-62166), 1,3-propanesultone (as described in JP-A-63-102173) and a lithium salt soluble in such a solvent, such as $LiClO_4$, $LiBF_4$, $LiPF_6$, $LiCF_3SO_3$, $LiCF_3CO_2$, $LiAsF_6$, $LiSbF_6$, $LiB_{10}Cl_{10}$ (as described in JP-A-57-74974), Li(1,2-dimethoxyethane)$_2ClO_4$ (as described in JP-A-57-74977), lower aliphatic carboxylate of lithium (as described in JP-A-60-41773), $LiAlCl_4$, LiCl, LiBr, LiI (as described in JP-A-60-247265), lithium chloroborane compound (as described in JP-A-61-165957) and lithium tetraphenylborate (as described in JP-A-61-214376). Typical among these combinations is an electrolyte comprising $LiClO_4$ or $LiBF_4$ incorporated in a mixture of propionic carbonate and 1,2-dimethoxyethane.

Alternatively, the nonaqueous battery of the present invention may comprise a solid electrolyte as mentioned below. (The term "nonaqueous electrolyte" as used herein also means a solid electrolyte as mentioned below. In this case, some solid electrolytes cause no liquid leakage. However, under the conditions on which a battery comprising a liquid electrolyte causes liquid leakage, a battery comprising such a solid electrolyte loses airtightness and exhibits a poor storability. Thus, the present invention is applied to a liquid electrolyte battery as well as a solid electrolyte battery.)

Solid electrolytes are classified as inorganic solid electrolytes or organic solid electrolytes. Such inorganic solid electrolytes include Li nitrides, halides and oxyacids. Useful among these compounds are $Li_3N$, LiI, $Li_5NI_2$, $Li_3N$-LiI-LiOH, $LiSiO_4$, $LiSiO_4$—LiI—LiOH (as described in JP-A-49-81899), $xLi_3PO_4$-$(1-x)Li_4SiO_4$ (as described in JP-A-59-60866), $Li_2SiS_3$ (as described in JP-A-60-501731), and phosphorus sulfide (as described in JP-A-62-82665).

Useful examples of organic solid electrolytes include polyethylene oxide derivatives or polymers containing such polyethylene oxide derivatives (as described in JP-A-63-135447), polypropylene oxide derivatives or polymers containing such polypropylene oxide derivatives, polymers containing ion dissociation groups (as described in JP-A-62-254302, JP-A-62-254303, and JP-A-63-193954), mixtures of polymers containing ion dissociation groups and the aforementioned aprotic electrolytes (as described in U.S. Pat. No. 4,792,504, and 4,830,939, and JP-A-62-22375, JP-A-62-22376, JP-A-63-22375, JP-A-63-22776, and JP-A-1-95117), and phosphoric ester polymers (as described in JP-A-61-256573).

Further, a polyacrylonitrile may be incorporated in an electrolyte (as described in JP-A-62-278774). Moreover, an inorganic solid electrolyte and an organic solid electrolyte may be used in combination (as described in JP-A-60-1768).

A separator is an insulating thin membrane having a high ion permeability and a predetermined mechanical strength. From the standpoint of resistance to organic solvents and hydrophobicity, a nonwoven cloth of olefin such as polypropylene, glass fiber, etc. may be used.

Carrier for electrode active materials include, for positive electrode, ordinary stainless steel, nickel and aluminum as well as porous foamed metal (as described in JP-A-59-18578), titanium (as described in JP-A-59-68169), expanded metal (as described in JP-A-61-264686) and punched metal or, for a negative electrode, ordinary stainless steel, nickel, titanium and aluminum as well as porous nickel (as described in JP-A-58-18883), porous aluminum (as described in JP-A-58-38466), sintered aluminum (as described in JP-A-59-130074), a formed body of aluminum fiber group (as described in JP-A-59-148277), surface-silvered stainless steel (as described in JP-A-60-41761), calcined carbon material such as a calcined phenol resin (as described in JP-A-60-112264), Al—Cd alloy (as described in JP-A-60-211779), porous foamed metal (as described in JP-A-61-74268), etc.

Suitable collectors include any electron conductor which does not undergo chemical change in the battery. Examples of electron conductors include stainless steel, titanium or nickel as well as nickel-plated copper (as described in JP-A-48-36627), titanium-plated copper, copper-treated treated stainless steel (for a positive electrode material) (as described in JP-A-60-175373).

There are several methods for sealing the battery. One of these methods is to dispose an insulating sealing material between a metal can which also serves one terminal and a metal cover or pin which also serves the other terminal. In this method, a metal can, an insulating sealing material, and cover or pin are normally superimposed on each other. Pressure is applied to the opening of the metal can (or one of the pins) so that it is plastically deformed in such a direction that the insulating sealing material is depressed (referred to as "crimp sealing" or "caulking") to seal the battery. In this case, the sealant of the present invention is applied to the surface of the insulating sealing material in contact with the metal can or the surface of the insulating sealing material in contact with the cover or pin (either or both of surfaces in contact with each other).

Another sealing method is to employ hermetic sealing for insulation. In this method, since hermetic sealing is normally applied to the cover, the cover is electrically isolated from its center to its outside. Therefore, the connection of the periphery of the cover to the metal can does not necessarily require an insulating sealing material.

In order to crimp-seal this structure, the sealant of the present invention may be provided between the metallic portion at the periphery of the cover and the metal can (either or both of surfaces in contact with each other). When a structure having a hermetic seal and an insulating sealing material at the periphery of the cover is crimp-sealed, the sealant of the present invention may be provided on the portion of the insulating sealing material in contact with the cover and can (either or both of surfaces in contact with each other).

Further, the sealant of the present invention may be applied to the portion at which airtightness is maintained by pressing a metal portion against another or a metal portion against a resin portion (either or both of surfaces in contact with each other).

The shape of the battery of the present invention is not limited, but may be coin, button, cylinder, square, film or the like.

Preferred embodiments of the present invention are described below:

(1) A nonaqueous battery comprising a positive electrode, a negative electrode made of an active material of a light metal or its alloy or an active material capable of intercalating/deintercalating lithium ion, and a nonaqueous electrolyte, wherein the battery is sealed off with a sealant comprising a pitch, at least one polymer and at least one montmorillonite.

(2) A nonaqueous battery as defined in paragraph (1), wherein the at least one polymer is a rubber.

(3) A nonaqueous battery as defined in paragraph (1), wherein the at least one polymer is a non-silicone rubber.

(4) A nonaqueous battery as defined in paragraph (1), wherein the at least one polymer is EPDM.

(5) A nonaqueous battery as defined in paragraph (1), wherein the at least one polymer is EPM.

(6) A nonaqueous battery as defined in paragraph (1), wherein the at least one polymer is SBR.

(7) A nonaqueous battery as defined in paragraph (1), wherein the at least one polymer is NBR.

(8) A nonaqueous battery as defined in paragraph (1), wherein the at least one polymer is IR.

(9) A nonaqueous battery as defined in paragraph (1), wherein the at least one polymer is CR.

(10) A nonaqueous battery as defined in paragraph (1), wherein the at least one polymer is CSM.

(11) A nonaqueous battery as defined in paragraph (1), wherein the at least one polymer is a polybutene.

(12) A nonaqueous battery as defined in any one of paragraphs (1) to (11), wherein the at least one montmorillonite is a montmorillonite containing a quaternary ammonium as the X ion intercalated between layers.

(13) A nonaqueous battery as defined in any one of paragraphs (1) to (11), wherein the at least one montmorillonite is a tri-octahedron type montmorillonite containing a quaternary ammonium as the X ion intercalated between layers.

(14) A nonaqueous battery as defined in any one of paragraphs (1) to (11), wherein the at least one montmorillonite is a hectorite containing a quaternary ammonium as the X ion intercalated between layers.

(15) A nonaqueous battery as defined in any one of paragraphs (1) to (14), wherein the pitch is a petroleum asphalt.

(16) A nonaqueous battery as defined in any one of paragraphs (1) to (14), wherein the pitch is a blown asphalt.

(17) A nonaqueous battery as defined in any one of paragraphs (1) to (14), wherein the pitch is a blown asphalt having a penetration (at 25° C.) of 10 to 20.

(18) A nonaqueous battery comprising a positive electrode, a negative electrode made of an active material of light metal or its alloy or an active material capable of intercalating/deintercalating lithium ion, and a nonaqueous electrolyte, wherein the battery is sealed off with a sealant comprising a blown asphalt, EPDM and at least one montmorillonite containing a quaternary ammonium as the X ion intercalated between layers.

The present invention will be further described in the following examples, but the present invention should not be construed as being limited thereto. Amounts are by weight unless otherwise indicated.

EXAMPLE 1

(A coin-shaped battery)

Figure 2:
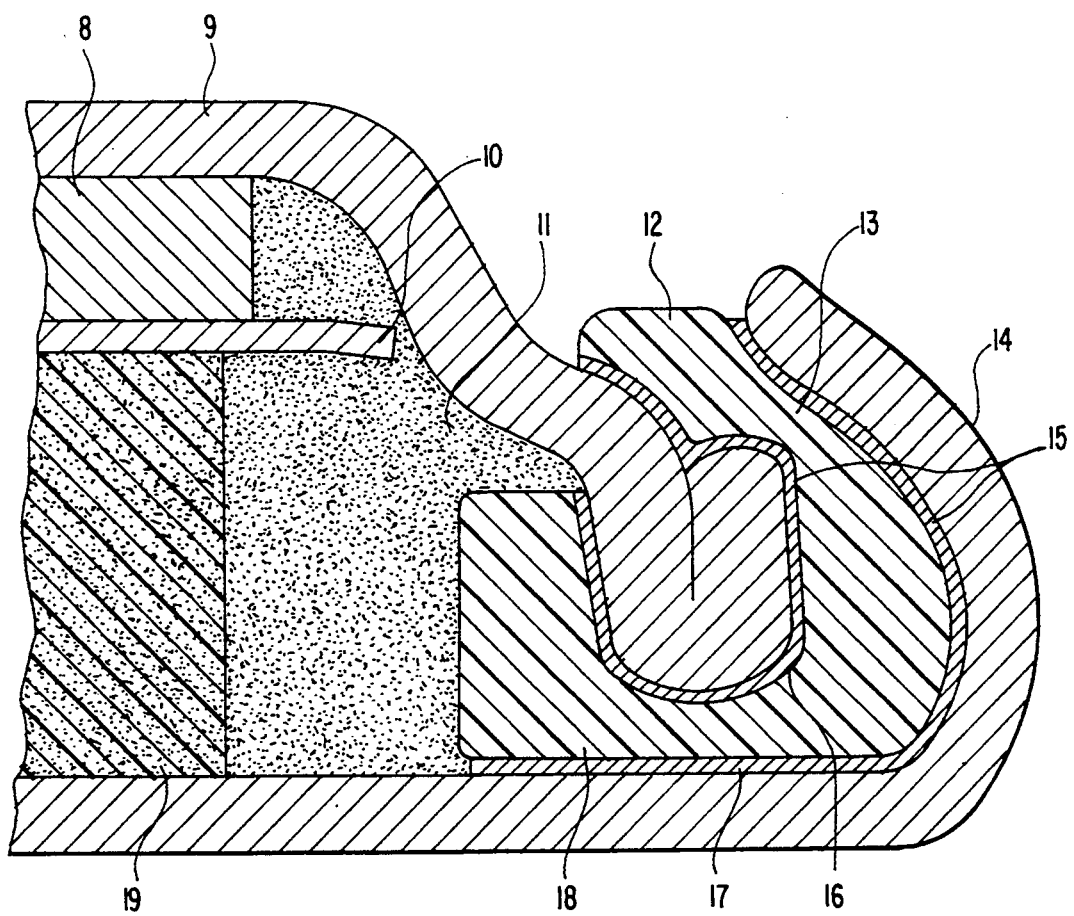
FIG. 2 is an enlarged detail of the part A of FIG. 1 wherein the sealant portion is shown highlighted (thickness is shown greater than actual)

A coin-shaped lithium battery as shown in FIG. 1 was prepared from electricity-generating elements, including a positive electrode comprising $V_6O_{13}$ as a positive electrode active material (shown at 6 in FIG. 1), a Li—Al negative electrode (Al content: 20% by weight; shown at 3 in FIG. 1), 1 mol/l of an LiBF$_4$ electrolyte (a mixture of propylene carbonate and 1,2-dimethoxyethane in the same amount), and a separator made of a porous polypropylene membrane (shown at 4 in FIG. 1), with members including a stainless steel positive electrode can serving also as a positive terminal (shown at 7 in FIG. 1), a stainless steel negative electrode can serving also as a negative terminal (shown at 2 in FIG. 1), and an insulating sealing material made of a synthetic resin (polypropylene)(also referred to as "gasket"). In this procedure, a sealant having the composition as described below was coated and dried between the positive and negative electrode cans serving also as positive and negative electrodes, respectively, and the insulating sealing material to prepare a sealant layer (as shown at 15, 16, 17 in FIG. 2). The sealant comprised Blown Asphalt 10-20 (having a penetration of 10 to 20 at 20° C.), which is a petroleum asphalt, as a pitch, EPDM (ethylene/propylene ratio (by weight)=50/50, Mooney viscosity (at 100° C.)=45, ethylidene norbornane used as a diene unit) as a polymer and a hectorite comprising dimethylbenzyl dodecylammonium intercalated between layers as a montmorillonite. Taking into the supposition that the abrasion of the sealing mold causes a reduction in sealing strength, a sealing mold which had been scraped thinner than the specified value and another sealing mold which had been scraped further thinner than the specified value were employed to enable three adjustments in the sealing strength, i.e., normal, slightly weaker and weaker.

| Composition of sealant | |
| --- | --- |
| Pitch | 95 g |
| Polymer | 5 g |
| Montmorillonite | 5 g |
| Toluene | 400 g |

EXAMPLE 2

(A coin-shaped battery)

A battery was prepared in the same manner as in Example 1 except that as the sealant the following composition was used, and a montmorillonite containing dioctadecyldimethyl ammonium intercalated between layers was used as a montmorillonite:

| Composition of sealant | |
| --- | --- |
| Pitch | 95 g |
| Polymer | 5 g |
| Montmorillonite | 5 g |
| Toluene | 400 g |

EXAMPLE 3

(A coin-shaped battery)

A battery was prepared in the same manner as in Example 1 except that as the sealant the following composition was used, and a hectorite containing sodium intercalated between layers was used as a montmorillonite:

| Composition of sealant | |
|---|---|
| Pitch | 95 g |
| Polymer | 5 g |
| Montmorillonite | 5 g |
| Toluene | 100 g |

EXAMPLE 4

(A coin-shaped battery)

A battery was prepared in the same manner as in Example 1 except that as the sealant the following composition was used, and IR (Mooney viscosity: 70) was used as a polymer:

| Composition of sealant | |
|---|---|
| Pitch | 90 g |
| Polymer | 10 g |
| Montmorillonite | 5 g |
| Toluene | 400 g |

EXAMPLE 5

(A coin-shaped battery)

A battery was prepared in the same manner as in Example 1 except that as the sealant the following composition was used and a polybutene (average molecular weight: 1,350) was used as a polymer:

| Composition of sealant | |
|---|---|
| Pitch | 95 g |
| Polymer | 30 g |
| Montmorillonite | 5 g |
| Toluene | 400 g |

COMPARATIVE EXAMPLE 1

(A battery comprising blown asphalt and silicone rubber)

A battery was prepared in the same manner as in Example 1 except that as the sealant the following composition was used:

| Composition of sealant | |
|---|---|
| Blown Asphalt 10-20 | 95 g |
| Silicone rubber | 5 |
| Toluene | 200 g |

COMPARATIVE EXAMPLE 2

(A battery comprising an aqueous dispersion of asphalt and SBR)

A battery was prepared in the same manner as in Example 1 except that as the sealant the following composition was used:
Composition of sealant
A 1:1 (weight ratio) mixture of an asphalt dispersion obtained by dispersing a toluene solution of an asphalt in water with a cationic surface active agent and a dispersion-suspension of an emulsion-polymerized styrene-butadiene rubber in water.

COMPARATIVE EXAMPLE 3

(A battery comprising blown asphalt and mineral oil)

A battery was prepared in the same manner as in Example 1 except that as the sealant the following composition was used:

| Composition of sealant | |
|---|---|
| Blown Asphalt 10-20 | 90 g |
| Mineral oil | 10 g |
| Toluene | 200 g |

COMPARATIVE EXAMPLE 4

(A battery comprising blown asphalt alone)

A battery was prepared in the same manner as in Example 1 except that as the sealant the following composition was used:

| Composition of sealant | |
|---|---|
| Blown Asphalt 10-20 | 100 g |
| Toluene | 200 g |

EXAMPLE 6

(A cylindrical battery)

Figure 3:
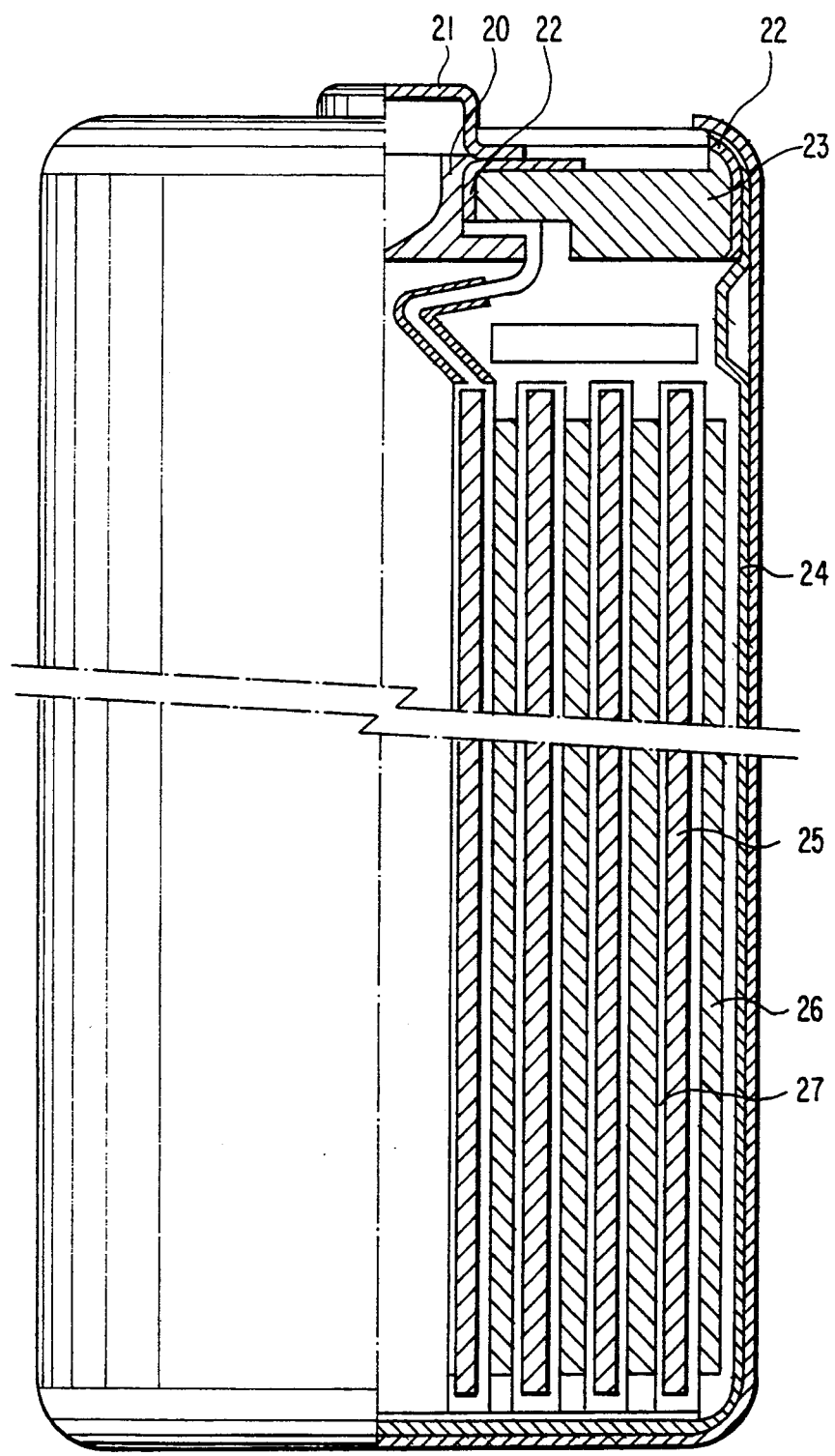
FIG. 3 is an embodiment of a cylindrical battery according to the present invention wherein the sealant portion is shown highlighted (thickness is shown greater than actual), in which the reference numerals 1, 5, 12, 13, 18, and 23 each represents an insulating sealing material made of a synthetic resin (polypropylene); the reference numerals 2, 9, and 24 each represents a negative electrode can which also serves as a negative electrode terminal; the reference numerals 3, 8, and 26 each represents a negative electrode; the reference numerals 4, 10, and 27 each represents a separator; the reference numerals 6, 19, and 25 each represents a positive electrode; the reference numerals 7, and 14 each represents a positive electrode can which also serves as a positive electrode terminal; the reference numeral 11 represents an electrolyte; the reference numerals 15, 16, 17 and 22 each represents a sealant; the reference numeral 20 represents a positive electrode pin which also serves as a positive electrode terminal; and the reference numeral 21 represents a positive electrode cap which also serves as a positive electrode terminal.

A cylindrical lithium battery as shown in FIG. 3 was prepared from electricity-generating elements, including a sheet positive electrode comprising $V_6O_{13}$ coated on an aluminum collector as a positive electrode active material (shown at 25 in FIG. 3), a Li—Al negative electrode (Al content: 20% by weight; shown at 26 in FIG. 3), 1 mol/l of an $LiBF_4$ electrolyte (a mixture of propylene carbonate and 1,2-dimethoxyethane in the same amount), and a separator made of a porous polypropylene membrane (shown at 27 in FIG. 3), with members including a stainless steel positive electrode pin and positive electrode cap serving also as a positive terminal (shown at 20, 21 in FIG. 3), a negative electrode can made of a nickel-plated aluminum serving also as a negative terminal (shown at 24 in FIG. 3), and an insulating sealing material made of a synthetic resin (polypropylene) (also referred to as "gasket"; shown at 23 in FIG. 3). In this procedure, the sealant having the composition as used in Example 2 was coated and dried between the positive electrode pin and negative electrode can serving also as positive and negative metal terminals, respectively, and the insulating sealing material to prepare a sealant layer (as shown at 22 in FIG. 3; the same sealant material and sealing strength as in Example 1).

COMPARATIVE EXAMPLE 5

(A cylindrical battery comprising silicone rubber)

A battery was prepared in the same manner as in Example 6 except that as the sealant the same composition used in Comparative Example 1 was used.

(1) Liquid leakage test for battery in Examples 1-6 and Comparative Examples 1-5:

100 pieces (50 pieces for cylindrical battery) of each of the aforementioned 11 kinds of batteries were prepared with the respective sealing strength, and then examined for liquid leakage in the same manner:

(a) Liquid leakage test method (example of low temperature heat cycle test)

These samples were each stored alternately in two air circulation type chambers adjusted to a temperature of −60° C. and 10° C., respectively, for 60 minutes. This procedure was repeated 100 times. After this test, these samples were allowed to stand at room temperature for 30 days. The number of samples causing liquid leakage was determined. In the table below, the figure indicates the number of samples causing liquid leakage out of 100 samples (50 pieces for cylindrical battery).

(b) Results of liquid leakage test

The results are set forth in Table 1.

TABLE 1

|  | Sealing strength | | |
| --- | --- | --- | --- |
|  | Normal | Slightly weaker | Weaker |
| Example 1 | 0 | 0 | 0 |
| Example 2 | 0 | 0 | 1 |
| Example 3 | 0 | 1 | 2 |
| Example 4 | 0 | 0 | 0 |
| Example 5 | 0 | 2 | 3 |
| Example 6 | 0 | 0 | 0 |
| Comparative Example 1 | 2 | 24 | 47 |
| Comparative Example 2 | 3 | 26 | 48 |
| Comparative Example 3 | 9 | 31 | 53 |
| Comparative Example 4 | 11 | 40 | 69 |
| Comparative Example 5 | 1 | 10 | 22 |

The results show that the batteries of the present invention prepared in Examples 1, 2, 3, 4, 5 and 6 exhibit excellent resistance to liquid leakage under the conditions of weak sealing strength as compared with the comparison batteries prepared in the comparative examples.

As mentioned above, the present invention can provide a nonaqueous battery which still exhibits a high resistance to liquid leakage at low temperatures even against the fluctuations of sealing strength.

While the invention has been described in detail and with reference to specific embodiments thereof, it will be apparent to one skilled in the art that various changes and modifications can be made therein without departing from the spirit and scope thereof.

What is claimed is:

1. A battery comprising a positive electrode, a negative electrode, and an electrolyte, wherein the battery is sealed with a sealant comprising a pitch, at least one polymer and at least one montmorillonite.

2. The battery according to claim 1, wherein the negative electrode is a light metal or alloy of a light metal or an active material capable of intercalating-/deintercalating lithium ion and the electrolyte is a nonaqueous electrolyte.

3. The battery according to claim 1, wherein the at least one polymer is a rubber.

4. The battery according to claim 1, wherein the at least one polymer is a non-silicone rubber.

5. The battery according to claim 1, wherein the at least one polymer is ethylene-propylene-diene monomer rubber.

6. The battery according to claim 1, wherein the at least one polymer is EPM.

7. The battery according to claim 1, wherein the at least one polymer is SBR.

8. The battery according to claim 1, wherein the at least one polymer is NBR.

9. The battery according to claim 1, wherein the at least one polymer is IR.

10. The battery according to claim 1, wherein the at least one polymer is CR.

11. The battery according to claim 1, wherein the at least one polymer is CSM.

12. The battery according to claim 1, wherein the at least one polymer is a polybutene.

13. The battery according to claim 1, wherein the at least one montmorillonite is a montmorillonite containing a quaternary ammonium intercalated between layers.

14. The battery according to claim 1, wherein the at least one montmorillonite is a tri-octahedron type montmorillonite containing a quaternary ammonium intercalated between layers.

15. The battery according to claim 1, wherein the at least one montmorillonite is a hectorite containing a quaternary ammonium intercalated between layers.

16. The battery according to claim 1, wherein the pitch is a petroleum asphalt.

17. The nonaqueous battery according to claim 1, wherein the pitch is a blown asphalt.

18. The nonaqueous battery according to claim 1, wherein the pitch is a blown asphalt having a penetration at 25° C. of 10 to 20.

19. A nonaqueous battery comprising a positive electrode, a negative electrode made of an active material of a light metal or an alloy of a light metal or an active material capable of intercalating/deintercalating lithium ion, and a nonaqueous electrolyte, wherein the battery is sealed with a sealant comprising a blown asphalt, ethylene-diene-monomer rubber and at least one montmorillonite containing a quaternary ammonium intercalated between layers.

* * * * *